(12) United States Patent
Park et al.

(10) Patent No.: US 8,166,543 B2
(45) Date of Patent: Apr. 24, 2012

(54) APPARATUS AND METHOD FOR DETECTING MALICIOUS FILE IN MOBILE TERMINAL

(75) Inventors: Jae Woo Park, Daejeon (KR); Dong Su Nam, Seoul (KR); Yun Ju Kim, Gyeonggi-do (KR); Young Tae Yun, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 914 days.

(21) Appl. No.: 12/142,080

(22) Filed: Jun. 19, 2008

(65) Prior Publication Data

US 2009/0150997 A1    Jun. 11, 2009

(30) Foreign Application Priority Data

Dec. 5, 2007  (KR) .................... 10-2007-0125652

(51) Int. Cl.
*G06F 11/00* (2006.01)
(52) U.S. Cl. .............................. 726/22; 726/23; 726/24
(58) Field of Classification Search .............. 726/11–15, 726/22–25; 713/187–188; 380/270
See application file for complete search history.

(56) References Cited

U.S. PATENT DOCUMENTS

2008/0148407 A1* 6/2008 Katkar ........................... 726/24

FOREIGN PATENT DOCUMENTS

| KR | 1020040090373 | 10/2004 |
| KR | 2006-0041123 A | 5/2006 |
| KR | 100651749 B1 | 11/2006 |

OTHER PUBLICATIONS

Sung Yap, et al; "A Mobile Phone Malicious Software Detection Model with Behavior Checker", HSI 2005, LNCS 3597, pp. 57-65, 2005.

* cited by examiner

*Primary Examiner* — Hosuk Song
(74) *Attorney, Agent, or Firm* — Ladas & Parry LLP

(57) ABSTRACT

Provided is an apparatus and method for detecting a malicious file that attempts to initiate communication in a mobile terminal without a user's approval. The method of detecting a malicious file in a mobile terminal includes: determining whether a file to be examined is an executable file; when the file is an executable file, examining whether the file is a malicious file that can cause unapproved communication based on at least one predetermined examination condition; and outputting the result of examining whether the file is the malicious file. Accordingly, an attack caused by a new type of malicious code can be coped with.

9 Claims, 3 Drawing Sheets

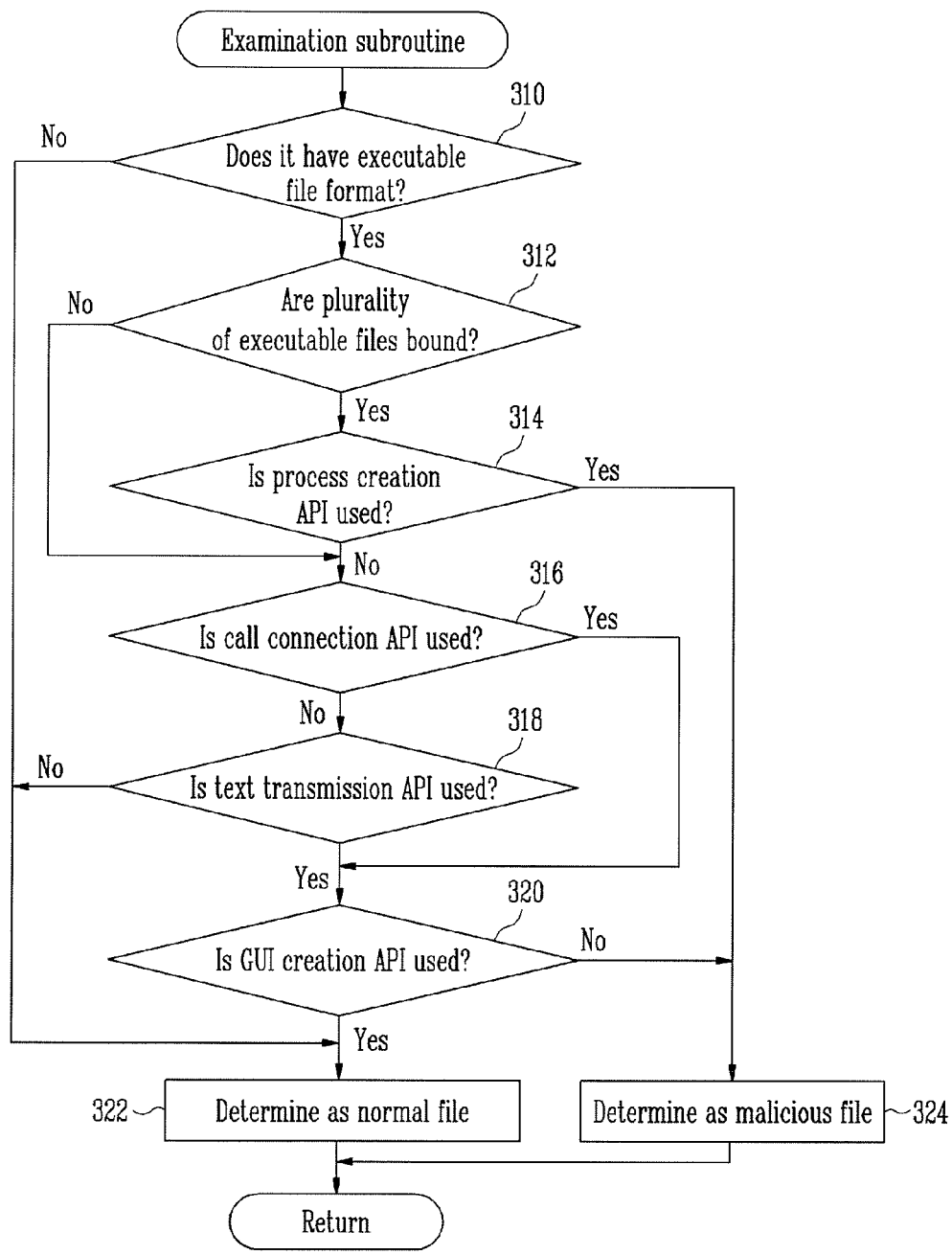

APPARATUS AND METHOD FOR DETECTING MALICIOUS FILE IN MOBILE TERMINAL

CROSS-REFERENCE TO RELATED APPLICATION

This application claims priority to and the benefit of Korean Patent Application No. 2007-125652, filed Dec. 5, 2007, the disclosure of which is incorporated herein by reference in its entirety.

BACKGROUND

1. Field of the Invention

The present invention relates to an apparatus and method for detecting a malicious file in a mobile terminal, and more particularly, to an apparatus and method for detecting a malicious file that initiates communication in a mobile terminal without a user's approval.

2. Discussion of Related Art

Recent developments in information technology (IT) have helped to dissolve environmental restrictions on the use of computers and the Internet. That is, due to progress towards a ubiquitous computing environment, various types of communication environment are being presented to users.

Increasing dependence on IT industries and diversity of communication environments has caused malicious codes (e.g., viruses, worms, etc.) that were confined to the Internet to spread into almost all kinds of mobile communication terminals. Such malicious codes are becoming a new problem for terminals used for wireless communication.

Such malicious codes that are executed in mobile terminals attempt to make phone calls or transmit text messages without the user's agreement. This can incur communication charges as well as cause personal harm.

Thus, various techniques are being disclosed to detect such malicious codes. Most recent antivirus solutions are using the pattern matching technique for detecting a malicious code. Pattern matching is the act of checking for the presence of the constituents of a given pattern. It can only find the known pattern that we have ever discovered. The limitation of pattern matching is that it could not detect the new types of malicious code.

While damage caused by such malicious codes has been mainly reported in high-quality European terminals using an asynchronous system (e.g., GSM), none has yet been reported in terminals using a synchronous system (e.g., CDMA). However, it is expected that synchronous terminals will soon fall target to malicious codes as well.

For this reason, a method for detecting new types of malicious codes is needed.

SUMMARY OF THE INVENTION

The present invention is directed to an apparatus and method for detecting a malicious file in a mobile terminal by detecting unapproved communication attempts.

Other objects of the present invention will be understood with reference to descriptions and exemplary embodiments presented below.

One aspect of the present invention provides a method for detecting a malicious file in a mobile terminal, including: determining whether a file to be examined is an executable file; when the file is an executable file, examining whether the file is a malicious file that can cause unapproved communication based on at least one predetermined examination condition; and outputting the result of examining whether the file is the malicious file.

Another aspect of the present invention provides an apparatus for detecting a malicious file in a mobile terminal, which includes: a user interface which a file to be examined is input to; a file examination unit for examining whether the file is a malicious file that can cause unapproved communication based on at least one predetermined examination condition, when the file is an executable file; and a result output unit for outputting the results from the file examining unit.

BRIEF DESCRIPTION OF THE DRAWINGS

The above and other objects, features and advantages of the present invention will become more apparent to those of ordinary skill in the art by describing in detail exemplary embodiments thereof with reference to the attached drawings in which:

FIG. 3 is a flowchart illustrating a detection subroutine according to an exemplary embodiment of the present invention.

DETAILED DESCRIPTION OF EXEMPLARY EMBODIMENTS

Detailed descriptions of certain functions or configurations have been omitted where it has been deemed that such detailed descriptions would detract from the overall clarity of the disclosure. Moreover, many of the names given to elements of the invention herein refer to those elements' functions and can be changed without affecting the invention.

Generally, mobile terminals are used to make phone calls or send text messages in response to a user's input. However, a malicious file may cause a mobile terminal to make a phone call or send a text message without a user's approval. The present invention offers an apparatus and method for detecting such a malicious file.

Hereinafter, exemplary embodiments of the present invention are described in detail with reference to accompanying drawings.

Figure 1:
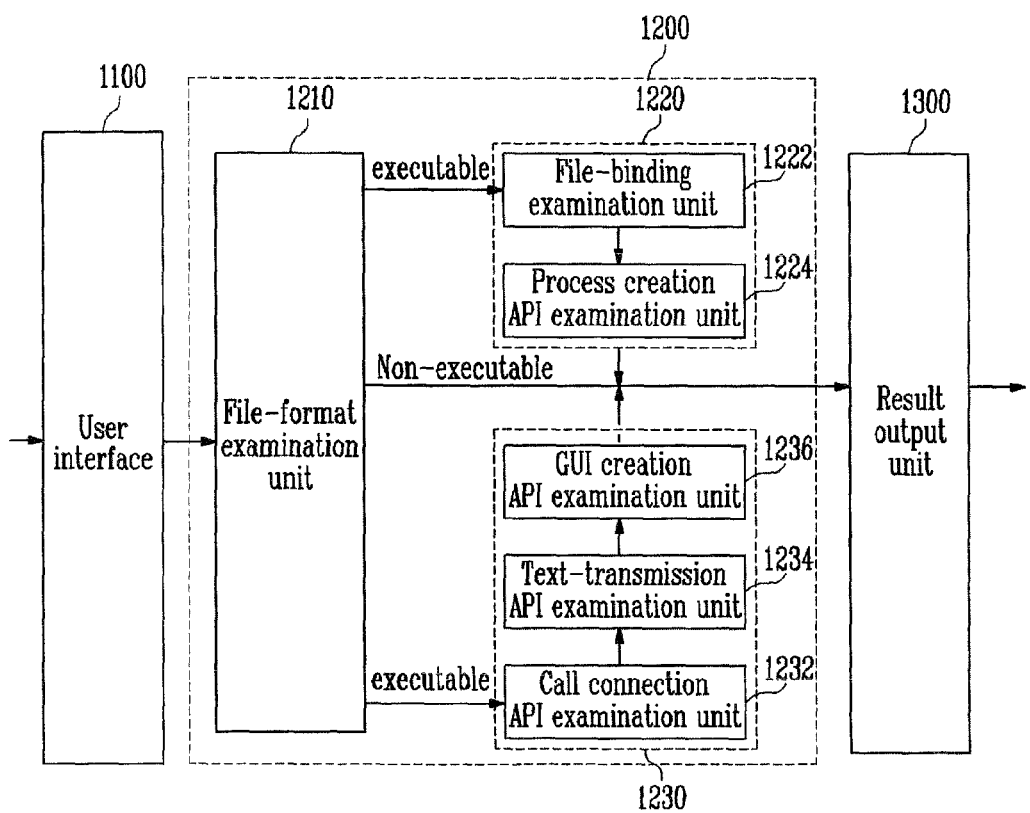
FIG. 1 is a block diagram of an apparatus for detecting a malicious file that can cause unapproved communication in a mobile terminal according to an exemplary embodiment of the present invention.

FIG. 1 is a block diagram of an apparatus for detecting a malicious file in a mobile terminal according to an exemplary embodiment of the present invention.

Referring to FIG. 1, a file to be examined (hereinafter, a target file) is input via a user interface 1100 and is forwarded to a file examination unit 1200. The target file may be a file received at the mobile terminal, a file downloaded by a user or a file attached to a received mail. However, it is not limited thereto.

The file examination unit 1200 examines whether the target file from the user interface 1100 is a malicious file. Malicious files, as referred to herein, include all kinds of files that attempt communication without a user's approval. The file examination unit 1200 includes a file-format examination unit 1210, a first malicious file determining unit 1220 and a second malicious file determining unit 1230.

The file-format examination unit 1210 determines whether the target file has an executable file format in the mobile terminal. That is, the file format examination unit 1210 examines whether the target file is a valid file that can be executed in a mobile terminal environment.

When the target file is determined as an invalid file by the file format examination unit 1210, no further examination of the target file is needed. This is because malicious communication can be made only by a file which is executable in the mobile terminal. At this point, the file-format examination unit 1210 outputs information that the target file is a non-executable file so as to stop examination of the target file.

Alternatively, when the target file is determined as a valid file by the file-format examination unit 1210, the examination needs to continue to determine whether the target file is malicious. This is because a file that is executable in the mobile terminal may be capable of initiating malicious communication. At this point, the file-format examination unit 1210 outputs information that the target file is executable so as to continue the examination to determine whether the target file is malicious.

The first malicious file determination unit 1220 receives the target file together with the information that the target file is executable. Then, the first malicious file determination unit 1220 determines whether the target file is malicious according to whether a plurality of executable files are bound within the target file, and whether a process creation API (Application Program Interface) is used during execution of the files. Using the process creation API indicates that another executable file is run by execution of the target file. Thus, the first malicious file determination unit 1220 determines the target file to be malicious if it includes a plurality of executable files and uses the process creation API when executed. To this end, the first malicious file determination unit 1220 includes a file-binding examination unit 1222 and a process creation API examination unit 1224.

The file-binding examination unit 1222 receives the target file together with the information that the target file is executable from the file-format examination unit 1210, and starts examining whether the target file binds (or includes) a plurality of executable files. Also, the process creation API examination unit 1224 determines whether the target file determined as including a plurality of executable files by the file-binding examination unit 1222 uses a process creation API. For example, a Windows-based mobile terminal may use CreateProcessW or ShellExecW as the process creation API.

When the target file includes a plurality of executable files and using the process creation API, the target file is determined to be malicious.

The second malicious file determination unit 1230 receives the target file together with the information that the target file is executable from the file-format examination unit 1210. The second malicious file determination unit 1230 determines whether the target file is malicious according to whether the target file uses an API that creates a graphic user interface (GUI) together with a call connection API, or uses an API that creates a GUI together with a text transmission API. To this end, the second malicious file determination unit 1230 includes a call connection API examination unit 1232, a text transmission API examination unit 1234 and a GUI creation API examination unit 1236.

The call connection API examination unit 1232 receives the target file together with the information that the target file is executable from the file format examination unit 1210, and starts examining whether the target file uses the call connection API. For example, a Windows-based mobile terminal may use RequestMakeCall as the call connection API.

Subsequently, the text transmission API examination unit 1234 receives the target file together with the information that the target file is executable, and starts examining whether the target file uses the text transmission API. For example, the Windows-based mobile terminal may use SmsSendMessage as the text transmission API.

When the target file is determined to use the call connection API by the call connection API examination unit 1232, or as using the text transmission API by the text transmission API examination unit 1234, the GUI creation API examination unit 1236 determines whether the corresponding target file uses the GUI creation API. For example, the Windows-based mobile terminal may use CreateWindowW or DialogBox as the GUI creation API.

As described above, the target file is determined to be malicious only when it uses the call connection API but not the GUI creation API, or when it uses the text transmission API but not the GUI creation API. The target file is not determined to be malicious when it uses the phone or text transmission API together with the GUI creation API.

A result output unit 1300 outputs the examination results provided by the file examination unit 1200. The result output unit 1300 may simply display the examination results provided by the file examination unit 1200, or may display a final determination result on whether the target file is malicious, based on the examination results provided by the file examination unit 1200.

For example, in order for the result output unit 1300 to assess the examination results, all examination results from examination units 1222, 1224, 1232, 1234, 1236 have to be provided to the result output unit 1300. Then, the result output unit 1300 makes an assessment of the examination results provided by the examination units 1222, 1224, 1232, 1234, 1236 and outputs a final result which is derived from the examination results as explained above.

Figure 2:
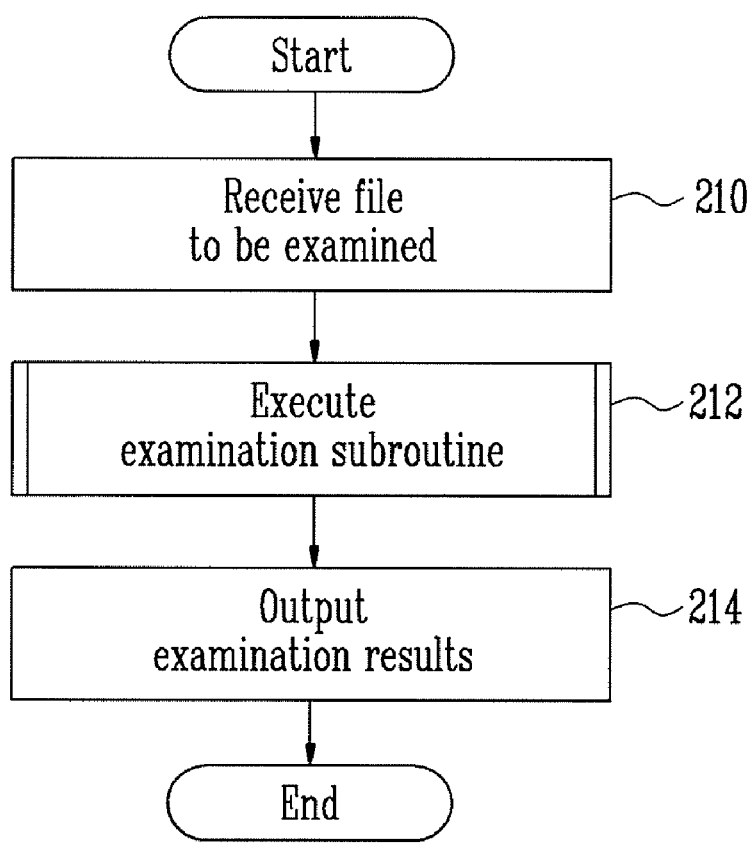
FIG. 2 is a flowchart illustrating a control process for detecting a malicious file in a mobile terminal according to an exemplary embodiment of the present invention.

FIG. 2 is a flowchart illustrating a control process for examining a malicious file in a mobile terminal according to an exemplary embodiment.

Referring to FIG. 2, a mobile terminal receives a target file from a user in step 210. Alternatively, the target file may be randomly selected from files stored in the mobile terminal. The mobile terminal performs an examination subroutine to examine whether the target file is malicious in step 212. That is, it is determined whether the target file is malicious based on the predetermined conditions in step 212. A detailed procedure of the examination subroutine for examining the target file based on the conditions will be described with reference to FIG. 3. Afterwards, the mobile terminal outputs an examination result by the examination subroutine in step 214.

FIG. 3 is a flowchart illustrating the examination subroutine according to an exemplary embodiment of the present invention. The examination subroutine illustrated in FIG. 3 may be divided into three processes: first and second examination processes and a determining process. The first examination process is performed by steps 310 to 314, and the second examination process is performed by steps 310 and 316 to 320. And, the determining process is performed by steps 322 and 324.

The first examination process examines whether an executable target file contains a plurality of executable files and uses a process creation API. The second examination process inspects whether the target file having an executable file format uses a call connection API or a text transmission API but not a GUI creation API. Finally, the determining process determines whether the target file is malicious based on the results from the first and second examination processes.

Referring to FIG. 3, it is determined whether the target file is executable in the mobile terminal in step 310. When the target file has a non-executable file format in the mobile terminal, the examination process is ended and step 322 is performed, thereby determining the target file to be normal, because a file that cannot be executed in the corresponding terminal cannot be malicious.

When the target file is determined to have an executable file format in the mobile terminal, step 312 is performed to determine whether the target file has at least two headers executable in the mobile terminal. That is, it is determined whether a plurality of executable files are bound within the target file. When the target file includes a plurality of executable files, it proceeds to the next examination process without considering whether the target file uses a process creation API. However, when the target file includes a plurality of executable files, step 314 is performed to determine whether the target file uses the process creation API. When the target file is determined to use the process creation API, the file is determined to be malicious in step 324. On the other hand, when the target file is determined not to use the process creation API, step 316 is performed.

In step 316, it is determined whether the target file uses a call connection API. That is, it is determined whether the target file attempts to make a call connection without user's approval. When the target file is determined to use the call connection API, step 320 is performed to determine whether the target file uses a GUI creation API. In step 320, when the target file is determined to use the GUI creation API, step 322 is performed to finally determine that the target file is normal. However, in step 320, when the target file is determined not to use the GUI creation API, it is determined that the target file is malicious in step 324.

In step 318, it is determined whether the target file uses a text transmission API. That is, it is determined whether the target file attempts to make a text transmission without a user's approval. When the target file is determined to use the text transmission API, step 320 is performed to determine whether the target file uses the GUI creation API. In step 320, when the target file is determined to use the GUI creation API, step 322 is performed to finally determine the target file to be normal. However, in step 320, when the target file is determined not to use the GUI creation API, it is determined that the target file is malicious in step 324.

According to the above processes, when the target file is finally determined to be normal in step 322, or malicious in step 324, the mobile terminal ends the examination subroutine and goes back to step 214 illustrated in FIG. 2.

As described above, the present invention can cope with attacks by new and unknown malicious codes by detecting malicious files according to characteristics of files used in mobile terminals.

While the invention has been shown and described with reference to certain exemplary embodiments thereof, it will be understood by those skilled in the art that various changes in form and details may be made therein without departing from the spirit and scope of the invention as defined by the appended claims.

For example, the present invention offers exemplary embodiments for determining whether a file input by a user is malicious, but methods described herein may be applied to a situation in which the file is not input by the user. Also, while the exemplary embodiments describe a series of several examination processes, the examination processes may be performed in parallel.

What is claimed is:

1. A method for detecting a malicious file in a mobile terminal, the method comprising:
providing a processor and a memory, the memory having stored thereon:
determining whether a file to be examined is an executable file;
when the file is an executable file, examining whether the file is a malicious file that can cause unapproved communication based on a predetermined examination condition,
wherein examining whether the file is malicious includes:
determining whether the file uses a call connection API;
determining whether the file uses a GUI creation API; and
determining that the file is malicious, when the file uses the call connection API but does not use the GUI creation API; and
outputting the result of examining whether the file is the malicious file.

2. The method according to claim 1, wherein the at least one examination condition is at least one selected from a first condition that the file includes a plurality of executable files and uses a process creation API, a second condition that the file uses a call connection API but does not use a GUI creation API, and a third condition that the file uses a text transmission API but does not use the GUI creation API.

3. The method according to claim 1, wherein examining whether the file is malicious includes:
determining whether the file includes a plurality of executable files;
determining whether the file uses a process creation API; and
determining that the file is malicious, when the file includes a plurality of the executable files and uses the process creation API.

4. The method according to claim 1, wherein examining whether the file is malicious includes:
determining whether the file uses a text transmission API;
determining whether the file uses a GUI creation API; and
determining that the file is malicious, when the file uses a text transmission API but does not use the GUI creation API.

5. A apparatus for detecting a malicious file in a mobile terminal, comprising:
a processor and a memory, the memory having stored thereon:
a user interface which a file to be examined is input to;
a file examination unit for examining whether the file is a malicious file that can cause unapproved communication based on a predetermined examination condition, when the file is an executable file,
wherein the file examination unit includes:
file-format examination unit for examining whether the file is executable; and
a first determination unit for determining the file to be malicious when the file includes a plurality of executable files and uses a process creation API,
wherein the file examination unit further includes a second determination unit for determining the file to be malicious when the file uses a call connection API but does not use a GUI creation API, and
a call connection API examination unit for examining whether the file uses the call connection API when the file is executable; and
a GUI creation API examination unit for examining whether the file uses the GUI creation API; and
a result output unit for outputting the results from the file examining unit.

6. The apparatus according to claim 5, wherein the at least one examination condition is at least one selected from a first condition that the file includes a plurality of executable files and uses a process creation API, a second condition that the file uses a call connection API but does not use a GUI creation API, and a third condition that the file uses a text transmission API but does not use the GUI creation API.

7. The apparatus according to claim 5, wherein the second determination unit further determines the file to be malicious when the file uses a text transmission API but does not use a GUI creation API.

8. The apparatus according to claim 5, wherein the first determination unit includes:

a file-binding examination unit for examining whether the file includes a plurality of executable files, when the file is executable; and a process creation API examination unit for examining whether the file uses the process creation API.

9. The apparatus according to claim 5, wherein the second determination unit further includes a text transmission API examination unit for examining whether the file uses the text transmission API when the file is executable.

* * * * *